United States Patent [19]

Schmidt

[11] Patent Number: 4,938,357

[45] Date of Patent: Jul. 3, 1990

[54] CORNER-ANGLE EDGE PROTECTOR

[75] Inventor: Wolfgang Schmidt, Schwelm, Fed. Rep. of Germany

[73] Assignee: Sander GmbH & Co., Wuppertal, Fed. Rep. of Germany

[21] Appl. No.: 397,694

[22] Filed: Aug. 23, 1989

[51] Int. Cl.⁵ .......................... B65D 6/36; B65D 63/00
[52] U.S. Cl. ................................ 206/453; 206/586; 217/69
[58] Field of Search ................... 206/453, 586; 217/69

[56] References Cited

U.S. PATENT DOCUMENTS

| | | | |
|---|---|---|---|
| 3,073,439 | 1/1963 | Symmonds, Jr. | 206/453 |
| 3,152,693 | 10/1964 | Anderson | 206/453 |
| 3,199,709 | 8/1965 | Morrison et al. | 206/453 X |
| 3,637,234 | 1/1972 | Thomas et al. | 206/453 X |
| 4,202,449 | 5/1980 | Bendt | 206/453 |
| 4,765,479 | 8/1988 | Roberts | 206/453 |
| 4,842,914 | 6/1989 | Franke | 206/453 X |

Primary Examiner—William Price
Attorney, Agent, or Firm—Martin A. Farber

[57] ABSTRACT

A corner-angle edge protector for strapped packages, bundles or the like, having a strapping-band passage opening which is open via a slot towards the adjacent edge of the corner-angle edge protector. At least the region adjacent the slot to the edge is developed as an elastically outwardly bendable tab which protrudes freely with spacing from the resting plane of the corner protector and the slot extends at an oblique angle to the lengthwise direction of the passage opening.

7 Claims, 6 Drawing Sheets

CORNER-ANGLE EDGE PROTECTOR

Field and Background of the Invention

The present invention relates to a corner-angle edge protector for strapped packages, bundles or the like having a strapping-band passage opening which is open via a slot towards the adjacent edge of the corner-angle edge protector.

In the known edge protectors of this type, there is a corner-angle edge protector which consists of layers of paper which are placed one above the other and glued together. The protector together with the slot form an E-shaped profile. A threading of the strap through the slot up into a free position of passage within the passage opening is difficult and, in many cases requires or causes an unfavorable cross-sectional kinking of the strap. The flexurally stiff development of the corner-angle edge protector is furthermore disadvantageous from the standpoint of applying the protector to the package.

In addition, corner-angle edge protectors of plastic are also known. In some of these protectors each arm of the corner-protector has, on its free-end region, an elevated tab below which the wrapping strap can be inserted. Other plastic corner-angle edge protectors (US Pat. No. 3,073,439) dispense entirely with wrapping-strap passage openings and have corresponding openings only in order to pass there through the end of an adhesive tape for attaching the corner-angle edge protector to the package. In the case of these corner protectors, a substantial intermediate space is produced in the manner that, adjoining the edge of the corner protector, the strap extends freely tensioned until again it passes into the place of application onto the package. Parts can also be easily caught thereon.

In still other embodiments of corner-angle edge protectors of plastic, a wrapping-strap passage opening is dispensed wit entirely and a broad side surface of the arm of the edge protector is allowed to come to a sharp edge in the direction towards a slot on the other side of which there then lies a tongue which, by being spaced from the opposite arm edge, leaves a threading slot. The tongue, in its turn, is again made of thinner material in order to leave a free space on the package-side broad surface for the passage of the wrapping strap. Although this embodiment provides corresponding wrapping-strap guides on both arms of the edge protector, it cannot be used for horizontal wrappings; there is the danger that the edge protector will have already fallen out before the strap has sufficient tension to hold it. To this extent, therefore, the wrapping of packages with these corner-angle edge protectors is considerably limited and impaired. The firm seat with respect to the strap is also not sufficiently great for all purposes of use.

Summary of the Invention

The object of the present invention is to develop a corner-angle edge protector which is of a simple structural shape and is optimally adapted for a rapid disturbance-free wrapping of packages with corresponding straps without impairing a subsequent handling of the package.

According to the invention at least the region adjacent the slot (11) to the edge (10) is developed as an elastically outwardly bendable tab (12) which protrudes freely with spacing from the resting plane of the corner protector and the slot (11) extends at an oblique angle to the lengthwise direction (x—x) of the passage opening (9).

As a result of this development, a corner-angle edge protector is created which, while being of simple structural shape, is very favorable in handling. The wrapping strap can be easily threaded into the passage opening by a greater or lesser bending out of the tab. It then no longer has to be kinked or the like in the transverse direction of its length. Nevertheless, a dependable seat is assured between the corner angle protector and the wrapping strap regardless of whether the wrapping strap extends in the horizontal plane or in the vertical plane. The oblique-angled alignment of the slot with the formation of two resiliently bendable tabs favors the threading of the strap and itself then prevents the strap from moving out by itself if, in order further to facilitate the threading, the slot is allowed, with slight bending of the tab, to debouch close to the transverse-side end of the passage opening.

Particularly high dependability is obtained by the fact that the strap can be removed from the opening only by bending away one of the resilient noses which are formed by the ends of the tabs which are separated by the oblique-angled slot and then pushing the tabs under one of the two edges of the strap, since, due to the special development, the strap edge which lies under the slot is always covered by both tabs. Even with a rounding of the edges of the opening, no unintentional unthreading of the strap out of the passage opening takes place.

The strap-guide shaft which is formed by the free protrusion of the tabs at a distance from the resting plane of the corner protector is advantageous since, even while retaining the thickness of material of the corner protector arms which is sufficient for the protection of the edge, the length of wrapping strap adjoining the passage opening cannot, even in tensioned condition, produce any bending of the tabs which would impair the seat of the corner-angle edge protector. The shaft free space which is formed also contributes to preventing the strap from falling out of the passage opening.

The strap is provided on the edges of the corner protector with a special protection against possible slippage or breakage since it is surrounded by resting ribs and the edge of the corner protector is developed as a semi-circular tube which enlarges the radius of bend.

BRIEF DESCRIPTION OF THE DRAWINGS

With the above and other objects and advantages in view, the present invention will become more clearly understood in connection with the detailed description of a preferred embodiment, when considered with the accompanying drawings, of which.

Each corner-angle edge protector 3 has a vertex region 4 which is rounded on the outside, and two arms 5 and 6.

On the arms 5 and 6 there are provided resting ribs 7 and 8 between which the wrapping strap extends in such a manner that the height of the resting ribs extends above the thickness of the strap.

The corner-angle edge protector is formed as a whole from elastically resilient plastic.

Figure 1:
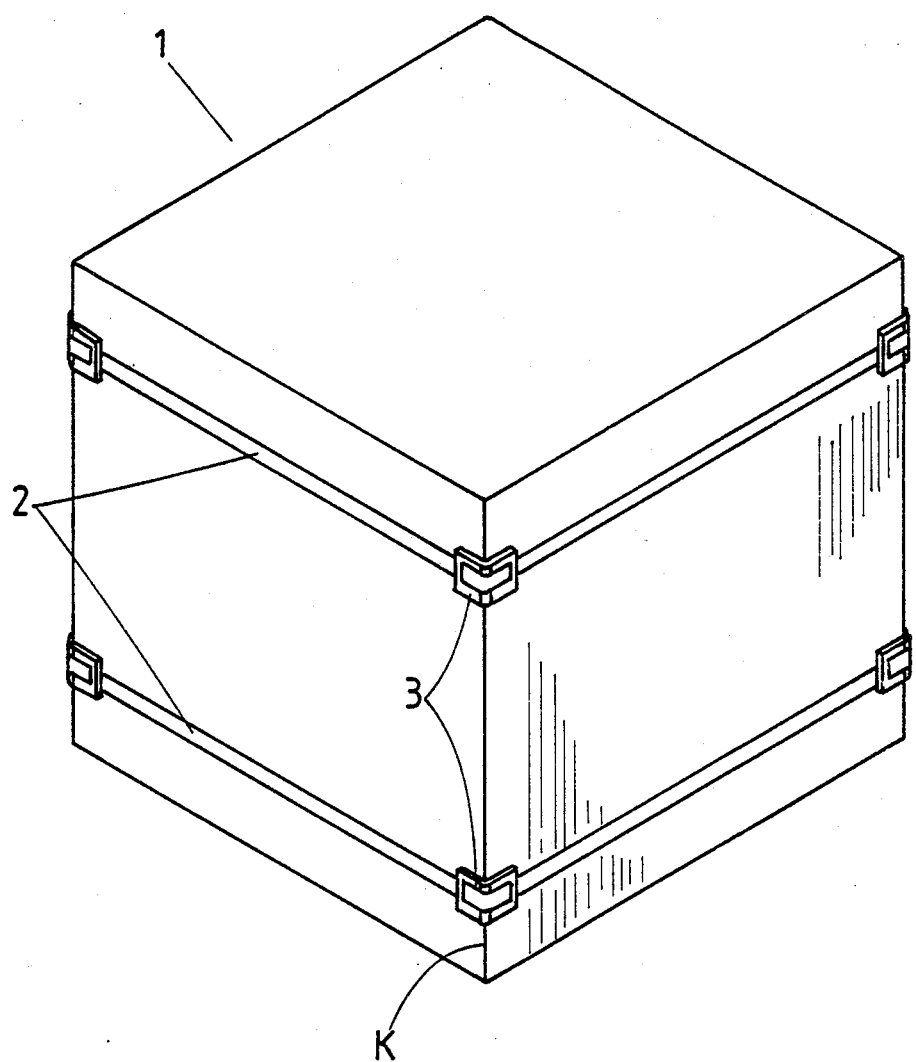
FIG. 1 is a perspective view of a package provided with the corner-angle edge protectors.
Figure 2:
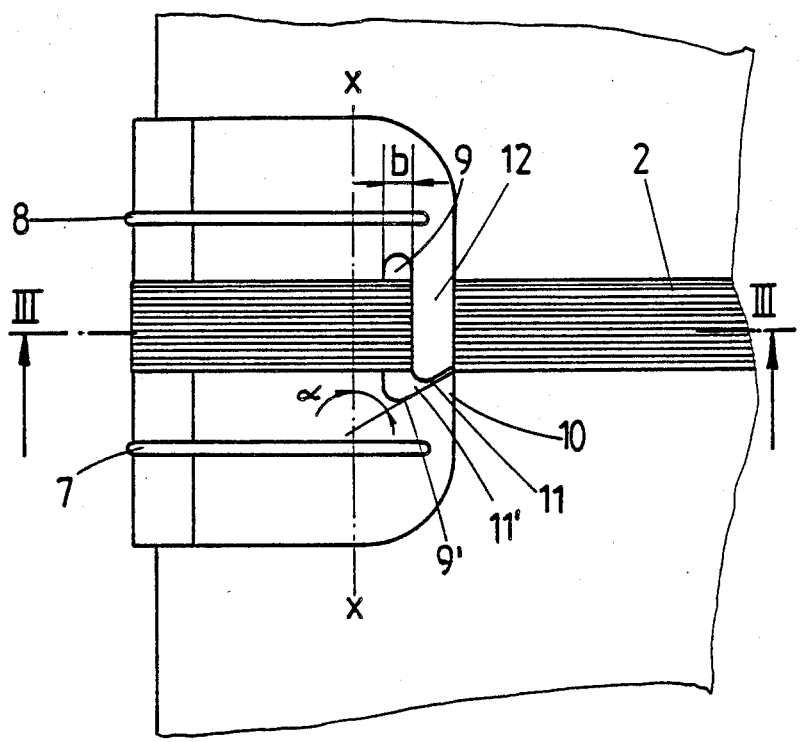
FIG. 2 is a view of a side of a package provided with a corner protector.
Figure 3:
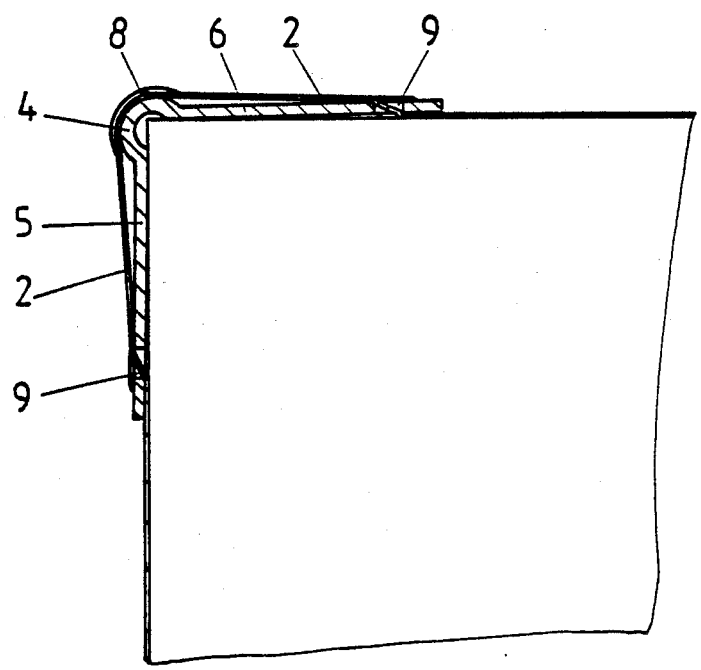
FIG. 3 is a section along the line III—III of FIG. 2.
Figure 4:
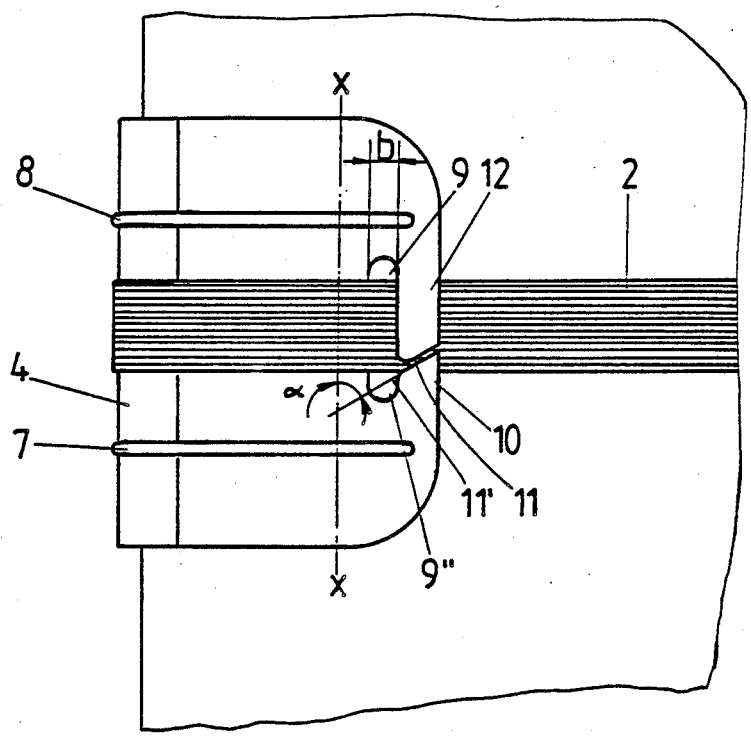
FIG. 4 is a perspective view of a slightly modified shape of the corner edge protector.

In an end region of the two arms 5 and 6, there are provided wrapping-strap passage openings 9. They take up in area a multiple of the cross section of the wrapping strap 2, in particular in the manner that the width b of each opening is a multiple of the thickness of the wrapping strap. Each passage opening 9 opens toward an edge 10 of the arms 5 and 6, by a slot 11 which is also kept as narrow as possible, at most corresponding approximately to the thickness of the strap 2. The slot 11 extends at an oblique angle (angle) to the course x—x of the passage opening. Its mouth end 11' lies close to the transverse-side end 9' of the passage opening. In the embodiment shown in FIG. 2, the slot 11 debouches practically within the region of the transverse-side end 9'; in the embodiment shown in FIG. 4, it is displaced from the cross-sectional center of the passage opening in the direction toward one transverse-side end 9''.

Figure 8:
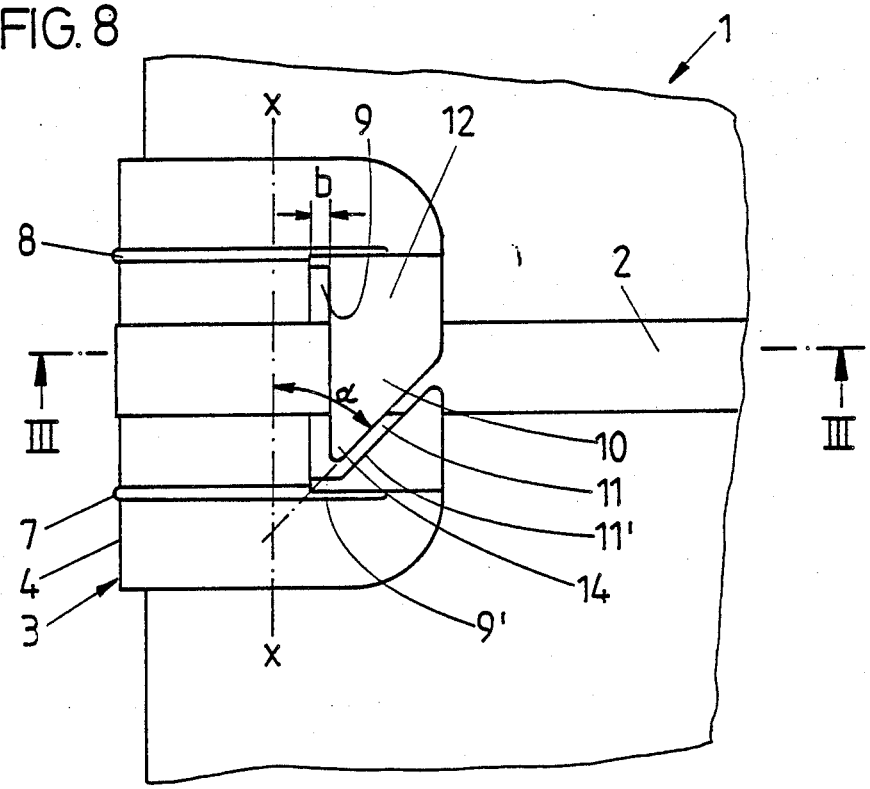
FIG. 8 is a similar view to FIG. 2 of an alternative embodiment.
Figure 9:
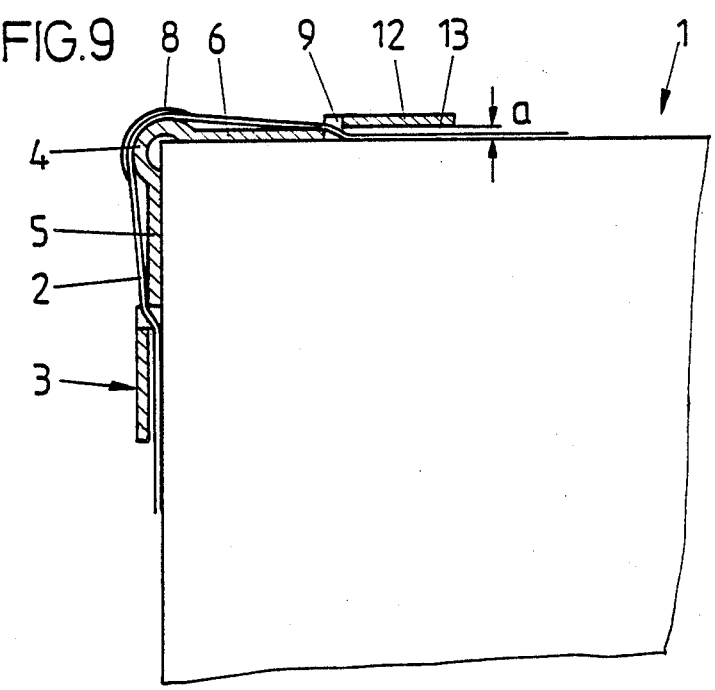
FIG. 9 is a view similar view to FIG. 3 of the alternative embodiment, follows the view as FIG. 6 for the alternative embodiment, and follows the view as FIG. 7 for the alternative embodiment, Detailed Description of the Preferred Embodiment The package is wrapped by the wrapping strap 2 and is protecting the package against being cut into by the wrapping strap.
Figure 10:
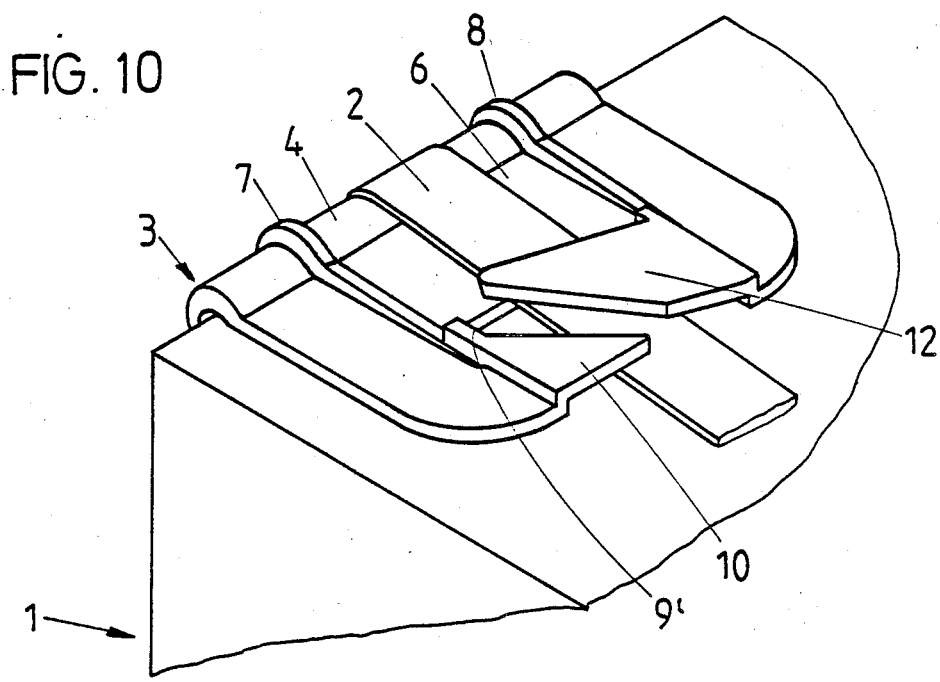
Figure 11:
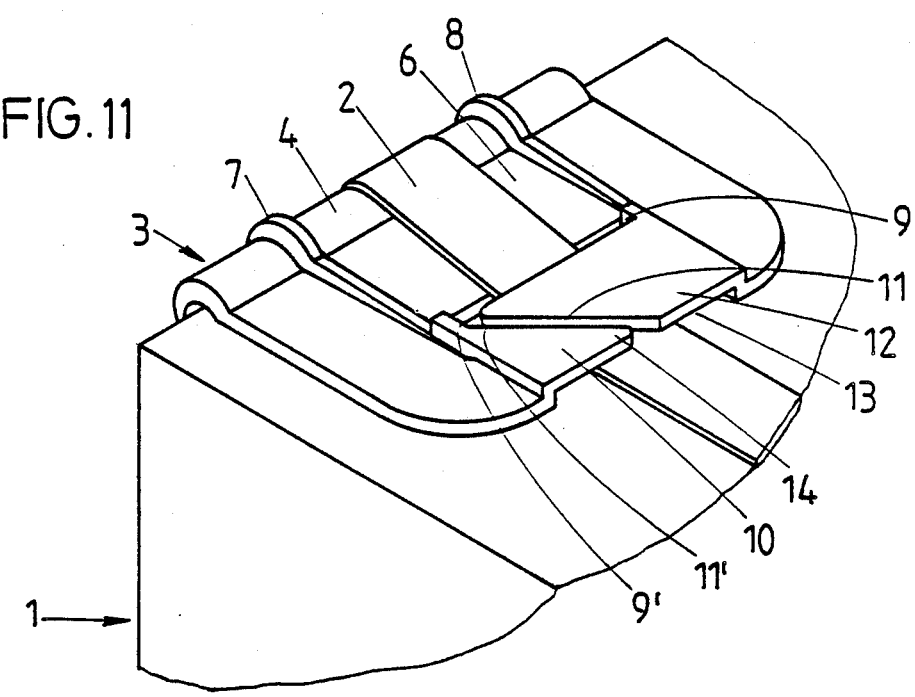

FIGS. 8 and 9 show an embodiment according to claim 4 in which the edge 10 of a arms 5 and 6 which form the tab 12 protrudes by a distance a from the corner-angle edge protector resting surface. This constitutes a raised slot edge which, in this way, the thickness of the strap.

The arrangement of the passage opening with respect to the slot is, in this connection, preferably a mirror image on the two corner protector arms 5 and 6.

Figure 5:
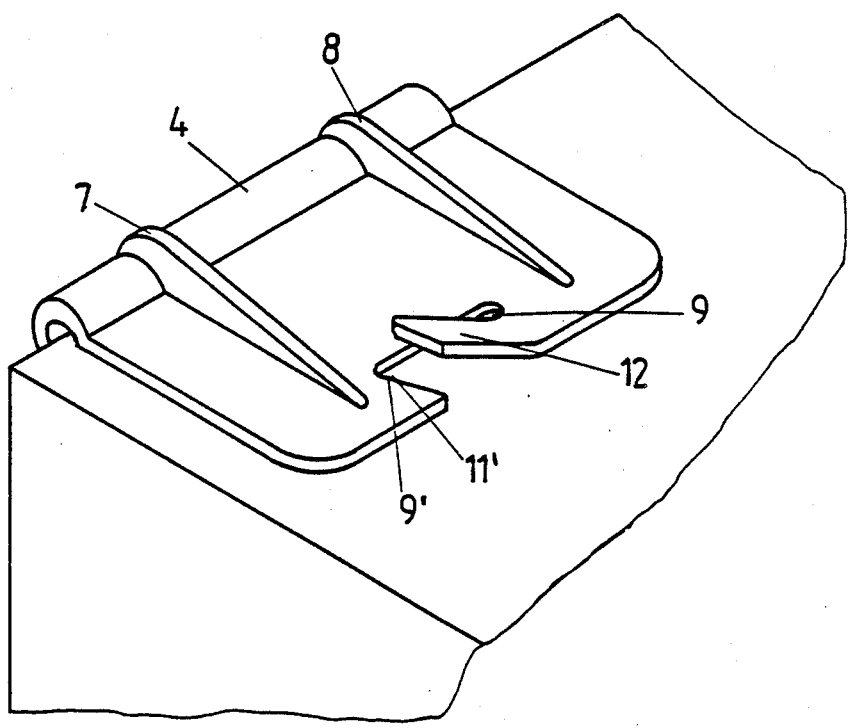
FIG. 5 is a perspective view of the protector showing the bending out of the tab (for the threading of the strap), FIG. 6 similar to FIG. 6 with associated wrapping strap.
Figure 6:
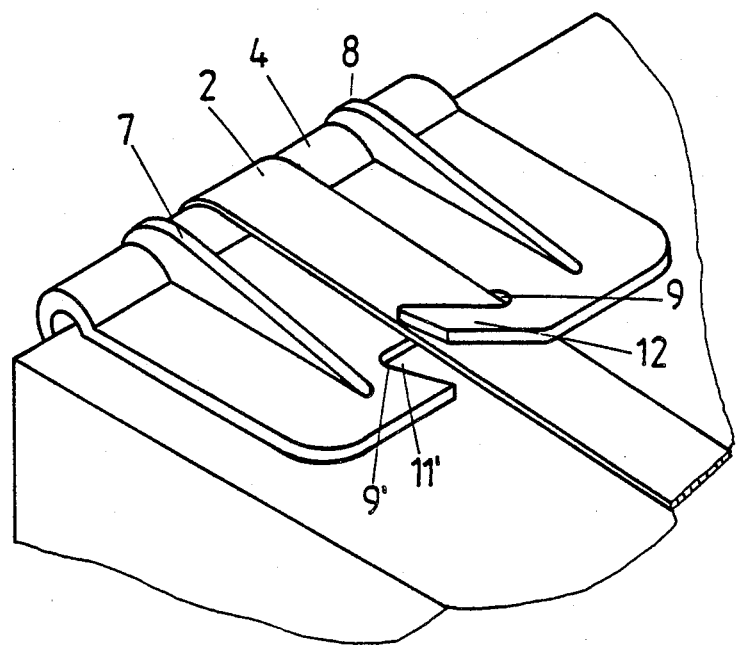
Figure 7:
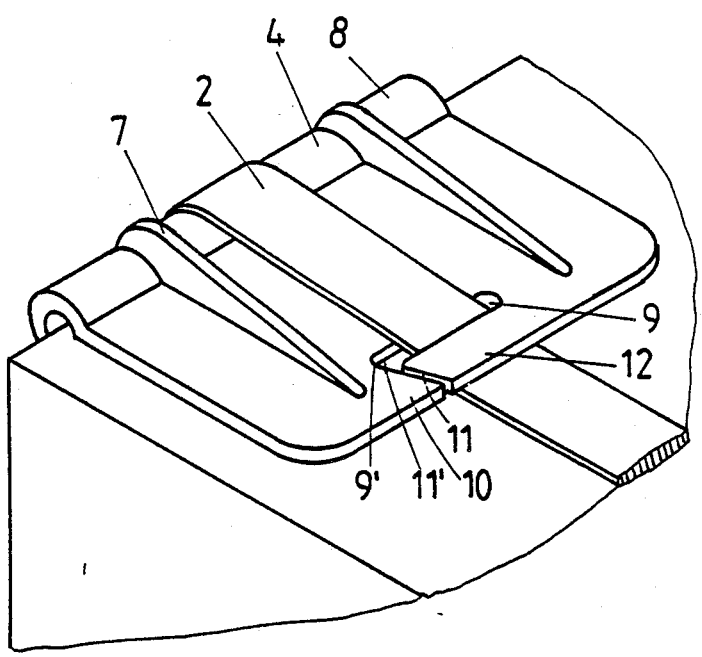
FIG. 7 is a view shows the protector view of FIG. 5 with the tab moved back into the base position.

The corresponding arrangement of the passage opening and the slot 11 with respect to each other, forms, together with the elastically resilient flexible plastic material selected, an elastically bendable tab 12. This favors the introduction of the strap 2 into the passage opening 9. The process is shown in FIGS. 5–7. The tab 12 is bent by hand or by the wrapping strap gripping below its edge out of the plane of the arm 5 or 6, as shown in FIG. 5. The wrapping strap is then brought into the crosswise position with respect to the passage opening 9. If the tab is now released, it assumes the position shown in FIG. 7; it again places itself on the top of the strap. The entire further process of the wrapping is effected in the manner that the wrapping strap is tightened slightly after this threading of the corner-angle edge protector; the corner-angle edge protectors, with a further slight pulling on the wrapping strap, are then positioned properly on the edges K whereupon the tensioning (preferably by machine) of the strap is effected. Despite easy threading, surprisingly, no unintentional unthreading takes place during this entire wrapping process; however, there are also no disadvantageous openings or edges on which things can be caught upon the transporting of the package.

Loosening of the strap is possible only by spreading open the nose 14 below the edge of the strap, the strap being then pushed over the nose.

All the features mentioned in the specification and shown in the drawing are essential to the invention, even if not expressly set forth in the claims.

I claim:

1. A corner-angle protector for strapped packages, and bundles, the protector comprising
    an arm to be positioned against the package or bundle, there being a strapping-band passage opening and a slot in an end of said arm, said passage opening being open via said slot towards an adjacent edge of the corner-angle edge protector; and
    wherein at least a region adjacent said slot to said edge is developed as an elastically outwardly bendable tab which protrudes freely from and is spaced apart from a resting plane of the corner protector and the slot; and
    said slot extends at an oblique angle to the lengthwise direction of the passage opening, the lengthwise direction being parallel to an edge of the package or bundle supporting the protector.

2. A corner-angle edge protector according to claim 1, wherein said slot debouches into the passage opening near a transverse-side end thereof.

3. A corner-angle edge protector according to claim 1, comprising a second arm extending in a direction opposite said first-mentioned arm, said second arm including a corresponding passage opening and slot.

4. A corner-angle edge protector according to claim 1, further comprising a tab which extends cantilevered, spaced with a predetermined spacing from a resting surface of the corner-angle edge protector.

5. A corner-angle edge protector according to claim 4, further comprising
    a second freely protruding tab which lies on the other side of the slot, said second tab being spaced from a resting surface of the corner protector.

6. A corner-angle edge protector according to claim 4, wherein the size of the spacing corresponds approximately to the thickness of said corner-angle edge protector arm.

7. A corner-angle edge protector according to claim 1, further comprising resting ribs disposed on said arm; and
    wherein said ribs extend approximately aligned with steps forming the tab; and
    the ribs protrude from an edge of said arm which is rounded in the form of a hemispherical pipe, a vertex line of the edge having a greater height than the upper edge of the steps.

* * * * *